US006729675B2

(12) United States Patent
Lumpe et al.

(10) Patent No.: US 6,729,675 B2
(45) Date of Patent: May 4, 2004

(54) COMMERCIAL VEHICLE, RAIL OR BUS VEHICLE ENTRY DOOR

(75) Inventors: Klaus Lumpe, Wuppertal (DE); Thorsten Bulle, Oberhausen (DE); Alois Ritt, Amstetten (DE)

(73) Assignee: Knorr-Bremse Systeme fur Schienenfahrzeuge GmbH, Munich (DE)

( * ) Notice: Subject to any disclaimer, the term of this patent is extended or adjusted under 35 U.S.C. 154(b) by 0 days.

(21) Appl. No.: 10/191,287

(22) Filed: Jul. 10, 2002

(65) Prior Publication Data

US 2003/0020287 A1 Jan. 30, 2003

(30) Foreign Application Priority Data

Jul. 10, 2001 (DE) ........................................ 101 33 438

(51) Int. Cl.[7] .............................. B60J 5/04; E05C 1/06

(52) U.S. Cl. ................................ 296/146.2; 296/146.1; 292/139; 292/DIG. 31

(58) Field of Search ........................... 296/146.1, 146.2; 105/341, 343; 292/DIG. 3, 53, 64, 67, 23, 139, 143, 165, 167, DIG. 31

(56) References Cited

U.S. PATENT DOCUMENTS 3,831,988 A * 8/1974 Stelma ....................... 292/302
3,934,925 A * 1/1976 Fetsch ........................ 296/178
4,578,968 A * 4/1986 Messier, Jr. .................. 70/208
4,603,894 A * 8/1986 Osenkowski ................ 292/216
4,892,338 A * 1/1990 Weinerman et al. .......... 292/35
5,460,100 A * 10/1995 Gowda et al. .............. 105/341
5,624,141 A * 4/1997 Kuo et al. .................. 292/165
5,927,020 A * 7/1999 Kobrehel ..................... 49/502
6,123,384 A * 9/2000 Eustache et al. ......... 296/146.2
6,263,804 B1 * 7/2001 Rizk .......................... 105/343
6,338,508 B1 * 1/2002 Kleefeldt .................... 292/201

* cited by examiner

*Primary Examiner*—D. Glenn Dayoan
*Assistant Examiner*—Gregory Blankenship
(74) *Attorney, Agent, or Firm*—Barnes & Thornburg LLP

(57) ABSTRACT

A commercial vehicle, rail or bus vehicle entry door comprising: a grip recess; a door lock; a closing device; a latching mechanism having at least one latch; a lock carrier area; and a latching mechanism carrier; wherein the door lock is held on the door and the closing device acts upon the latching mechanism in order to move the at least one latch of the latching mechanism into a closed or opened position; and wherein the lock carrier area can be fastened on the door and which, together with the grip recess, forms a one-piece basic component on which the latching mechanism carrier carries the latching mechanism in a detachable and reversible manner for the optional mounting of the door lock for a door hung by one of a right side mounting and one of a left side mounting.

17 Claims, 4 Drawing Sheets

COMMERCIAL VEHICLE, RAIL OR BUS VEHICLE ENTRY DOOR

BACKGROUND AND SUMMARY OF THE INVENTION

Priority is claimed to German Patent Application, Ser. No. 101 33 438.9, filed Jul. 10, 2001.

The invention relates to a commercial vehicle, rail or bus vehicle entry door.

Such a door is known from the prior art and has a grip recess and a door lock held on the door frame, the grip recess and the door lock representing separate components. The door lock contains a closing device acting upon a latching mechanism in order to move at least one latch of the latching mechanism into the closing or opening position. According to the type of the selected door lock, a correspondingly constructed receiving device must be worked into the door frame. In addition, different door locks are provided for doors hung on the left or on the right.

The present invention is directed to a commercial vehicle, rail or bus vehicle entry door comprising: a grip recess; a door lock; a closing device; a latching mechanism having at least one latch; a lock carrier area; and a latching mechanism carrier; wherein the door lock is held on the door and the closing device acts upon the latching mechanism in order to move the at least one latch of the latching mechanism into a closed or opened position; and wherein the lock carrier area can be fastened on the door and which, together with the grip recess, forms a one-piece basic component on which the latching mechanism carrier carries the latching mechanism in a detachable and reversible manner for the optional mounting of the door lock for a door hung by one of a right side mounting and one of a left side mounting.

Because of the one-piece basic component, in which the grip recess as well as the lock carrier are integrated, the number of components to be manufactured, to be stored and to be mounted is reduced. As a result of the latching mechanism carrier being fastened in a reversible manner on the basic component, a door lock for a right-hung door as well as for a left-hung door can be produced by means of identical components because, by reversing the latching mechanism, the latch will then project either to the right or to the left. On the whole, variants of the door according to the invention can thereby be produced at low cost.

Special preferable embodiments may provide that the basic component is constructed as a standardized carrier element for different door locks. Every door can therefore, on the one hand, be provided with identical connection measurements for the basic component, whereby the tool and manufacturing costs are lowered. On the other hand, because of the standardized construction of the basic component, several door lock variants can be presented by means of a single structural element.

According to a further possible development, the latching mechanism carrier contains at least one plate with bores which can be fitted onto at least one carrying pin projecting away from the basic component. As a result, the latching mechanism carrier can be mounted and demounted on the basic component in a simple and rapid manner. Furthermore, a mounting is also easily possible in a reversed position.

According to another possible embodiment, the door lock may have a receiving device for different closing devices, such as a 90-degree or a 180 degree closing device. This may be accomplished by a nut which is rotatably disposed between two parallel plates forming the latching mechanism carrier. The receiving device has a center opening on whose radially interior circumferential surface a polygonal surface is provided for the engagement of different connection elements or inserts of closing devices. As a result, the door lock can be provided with different closing devices without additional changes, which results in a cost-effective manufacturing of variants.

According to another possible embodiment, the door may have a door frame surrounding the door circumference, at which door frame a door glass pane is fastened which essentially extends along the entire door height and door width. The basic component can then be fixed at the door glass pane without any direct connection to the door frame, and can preferably be glued to the door glass pane. Advantageously, the previously customary high-expenditure machining of the door frame for producing an individual receiving device for the door lock can be eliminated. Only a passage bore, as a passage for the latch and which is aligned with the latch, is to be provided in the door frame.

Additionally, the glass pane can have an area of a blackening extending around in the immediate vicinity of the door frame, wherein a latch position indicator may be provided which is integrated in the latching mechanism and by means of which the currently existing latched or unlatched position of the latch is visible through a gap in the blackening.

As an additional possible measure, an opening device acting upon the latching mechanism is provided for unlatching the latched door lock from the inside, which opening device is preferably formed by a handwheel. This complies with the requirements of ECE-R 36, according to which it must be possible to open the door from the inside in the event of an emergency situation.

Other aspects, advantages and novel features of the present invention will become apparent from the following detail description of the invention when considered in conjunction with the accompanying drawings.

DETAILED DESCRIPTION OF THE PREFERRED EMBODIMENTS

Figure 1:
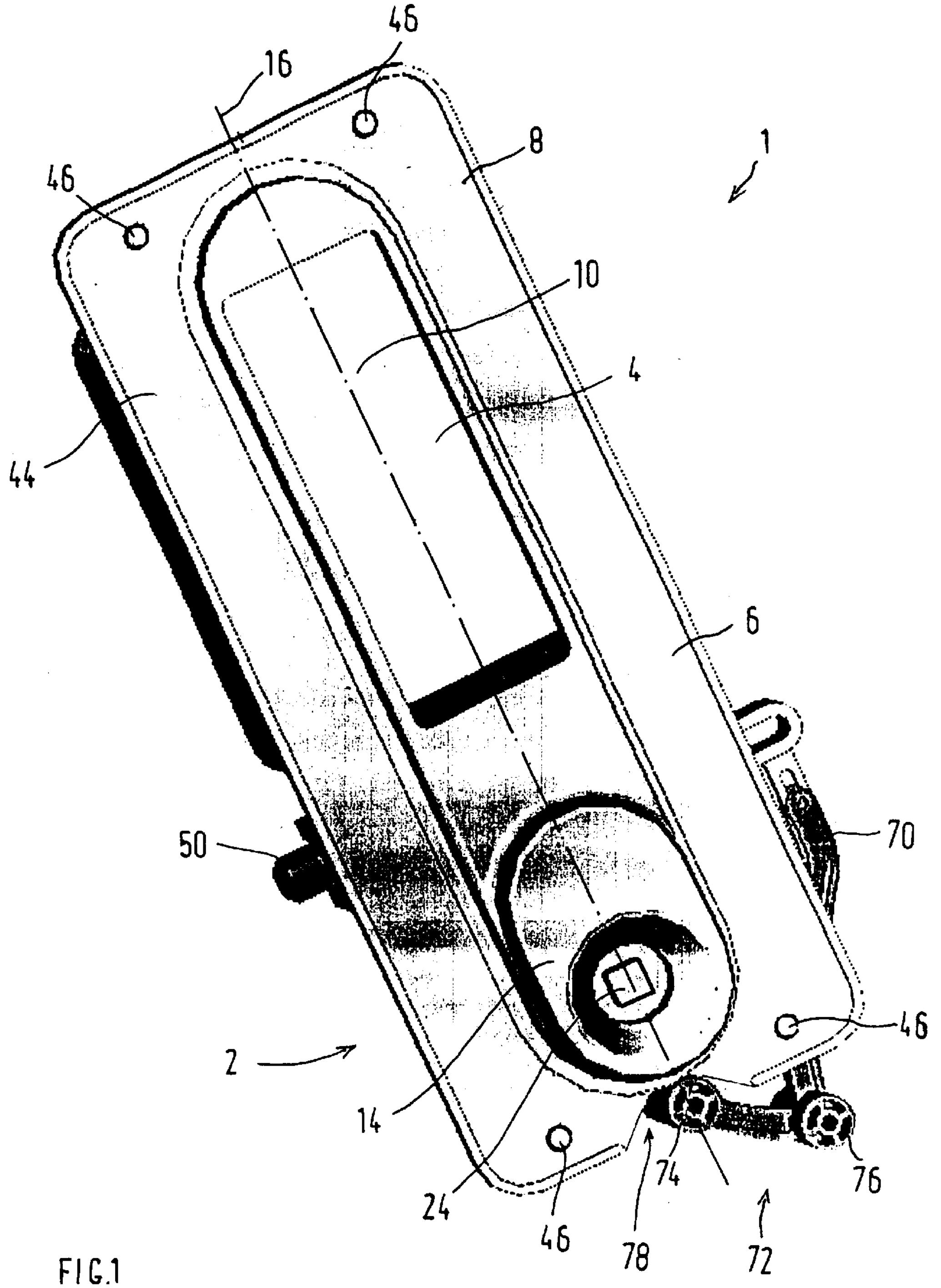
FIG. 1 is a perspective exterior view of a door lock, according to the principles of the present invention.

For reasons of scale, FIG. 1 shows only a door lock 1 of a bus door in a view from the outside as a preferred embodiment of an entry door according to the invention. In the following, the interior side is the side of the bus door pointing to the vehicle occupant compartment and the exterior side is the side of the bus door pointing to the open air.

Figure 2:
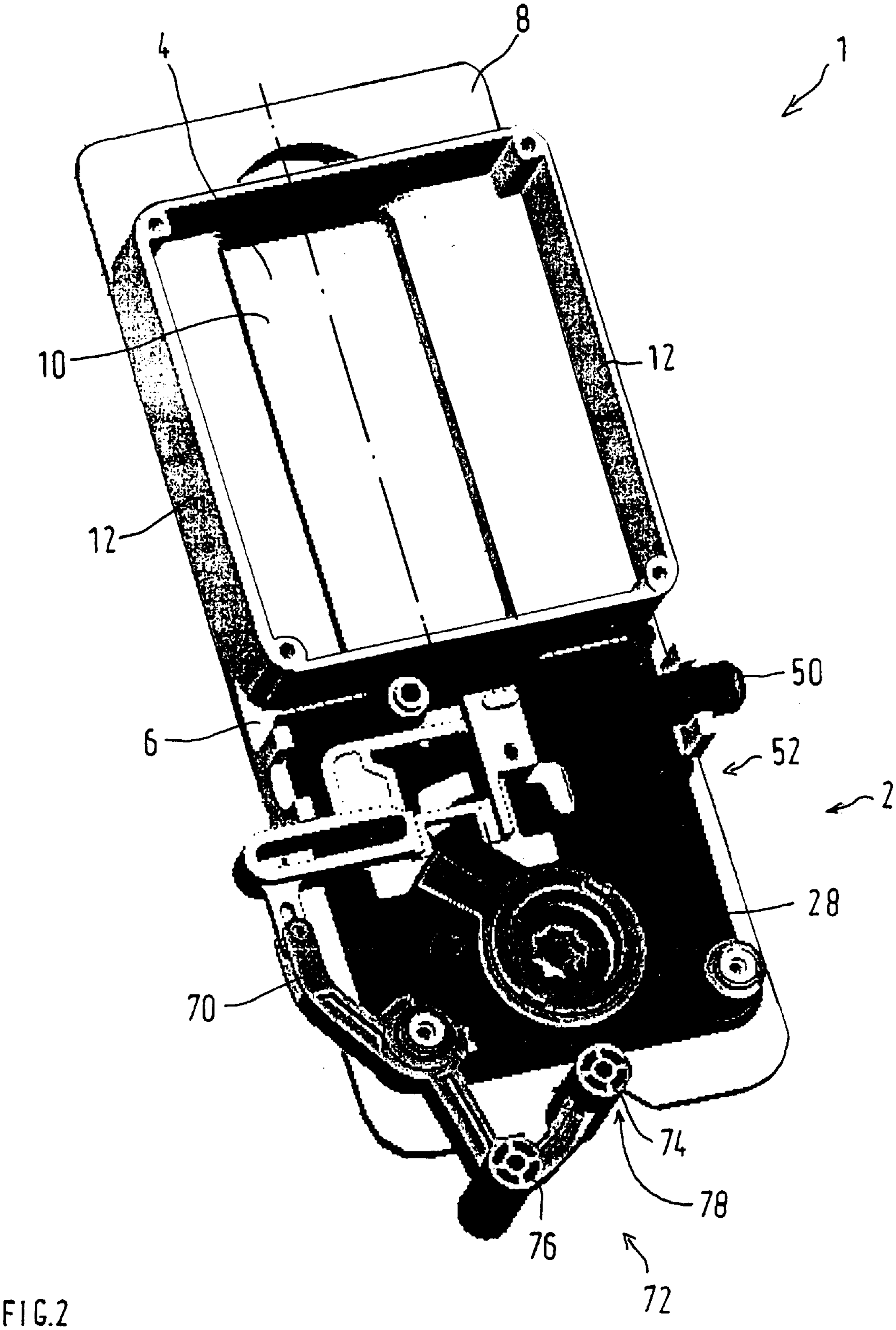
FIG. 2 is a perspective interior view of the door lock of FIG. 1.

As seen in FIGS. 1 and 2, the door lock 1 comprises a lock carrier area 2 which, together with a grip recess 4, is constructed as a one-piece basic component 6 preferably in the form of an injection-molded blank.

Viewed in an installed position in the bus door (not shown), the grip recess 4 has a preferably oval or rectangular grip recess opening 10 arranged above the lock carrier area 2 and constructed in a plate-shaped screen 8. Grip recess 4 has a surrounding grip recess wall 12, which has a rectangular cross-section, projects away from the screen 8 toward the interior side and is spaced laterally with respect to the edge of the grip recess opening 10, so that a hand can reach behind the grip recess 4, as illustrated particularly in FIG. 2. The lock carrier area 2 of the basic component 6, arranged below the grip recess 4, comprises an essentially oval section 14 projecting toward the exterior side. The basic component 6 is axially symmetrical with respect to its vertical enter axis 16 and can therefore be used for doors hung on the left as well as for doors hung on the right, as will be explained later. In addition, the basic component 6 is constructed as a standardized carrier element for different door locks.

Figure 4:
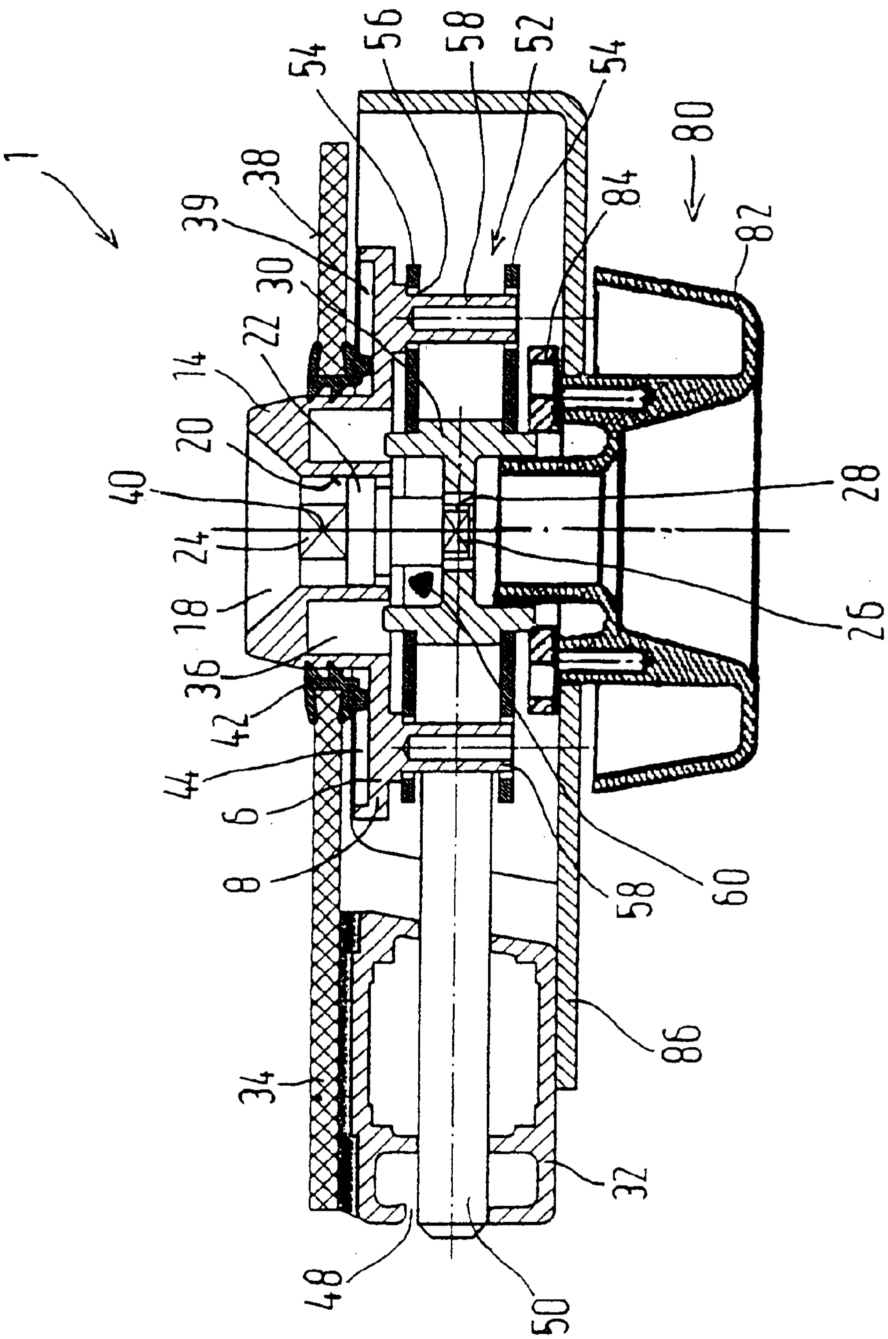
FIG. 4 is a sectional view along Line IV—IV of FIG. 3.

The oval section 14 of the lock carrier area 2 is provided in its lower area with a passage bore 18 which tapers in a funnel shape toward the interior side and leads into a cylindrical section 20, as indicated in FIG. 4. This cylindrical section 20 forms a receiving device for a closing device (not identified) which is constructed as connection elements or an insert 22 and which, at its end pointing to the exterior side, has a square application surface 24 for a square wrench. The other end of the insert 22 pointing to the interior side has a connection element in the form of another square application surface 26 which engages in a coaxial, polygonal passage opening 28 of a nut 30 and, as a result, is non-rotatably connected with the latter. The passage opening 28 of the nut 30 and the cylindrical section 20 in the basic component 6 are constructed such that, instead of an insert 22 with a square application surface 24, other closing devices can also be inserted into the door lock 1, as, for example, a closing cylinder of the Type YMOS, BN or PS with a 90 degree or 180 degree angle of rotation.

The bus door (not shown) has a door frame 32 extending around the door circumference in a rectangular manner with a hollow door profile (not identified) illustrated in its cross-section in FIG. 4. At the hollow door profile, a door glass pane 34 is fastened to a surface pointing toward the exterior side and extends essentially along the entire door height and door width. In this case, the door glass pane 34 preferably completely covers the door frame 32 although such is not necessary.

The basic component 6 of the door lock 1 is not fixed directly to the door frame 32 but to the door glass pane 34. For this purpose, the door glass pane 34 has, close to the door frame 32, a receiving device in the form of a vertically extending oblong hole 36, which is preferably arranged in the area of a blackening 38 of the door glass pane 34 extending around preferably in the area of a direct vicinity of the door frame 32. At an edge of the oblong hole 36 pointing to the interior side, the basic component 6 is preferably fastened by means of a glued connection 39, although other types of connections can be used. In this case, a center axis 40 of the oblong hole 36 and the center axis 16 of the basic component 6 are superimposed. In addition, the oblong hole 36 is dimensioned such that a gripping into the grip recess 4 of the basic component 6 is possible from the exterior side. The oval section 14 of the basic component 6 projects as a centering collar through the oblong hole 36 of the door glass pane 34, a surrounding lip seal 42, which is arranged between the basic component 6 and the edge of the oblong hole 36, to provide that splashing water cannot penetrate to the interior side. On its side pointing to the door glass pane 34, a flat screen 8 of the basic component 6 has a pulled-back groove-like surrounding area 44 for receiving the glue of the glued connection 39 as well as contact points 46 (see FIG. 1). The contact points 46 are constructed as short pins to contact the door glass pane 34, which contact points 46 act as spacers, permitting a gluing of the essentially flat basic component 6 to slightly curved door glass pane 34.

As illustrated in FIG. 4, a transverse bore 48 is provided in the door frame 32 which is used as a passage opening for a basic latch 50 of a latching mechanism 52 of the door lock 1. Latch 50 extends transversely to the longitudinal direction of the basic component 6. The passage opening or bore 48 aligned with the latch 50 permits the latch 50 to engage beyond the door frame 32 in a door portal engaging device, which is not shown, in the closed position of the latch. A latching mechanism carrier (not identified) carrying or supporting the latching mechanism 52 is fixed to the basic component 6. For this purpose, the latching mechanism carrier preferably has two plates 54, which are arranged at a parallel distance from one another, are provided with bores 56 and can be fitted onto at least two carrying pins 58 projecting away from the basic component 6 toward the interior side. The two plates 54, act as a bearing point, with a bore 60 therebetween aligned with the passage opening 28 of the nut 30 to hold the nut 30 rotatably so that rotating movements introduced into the insert 22 by way of the square application surface 24 can be transmitted to the nut 30.

Figure 3:
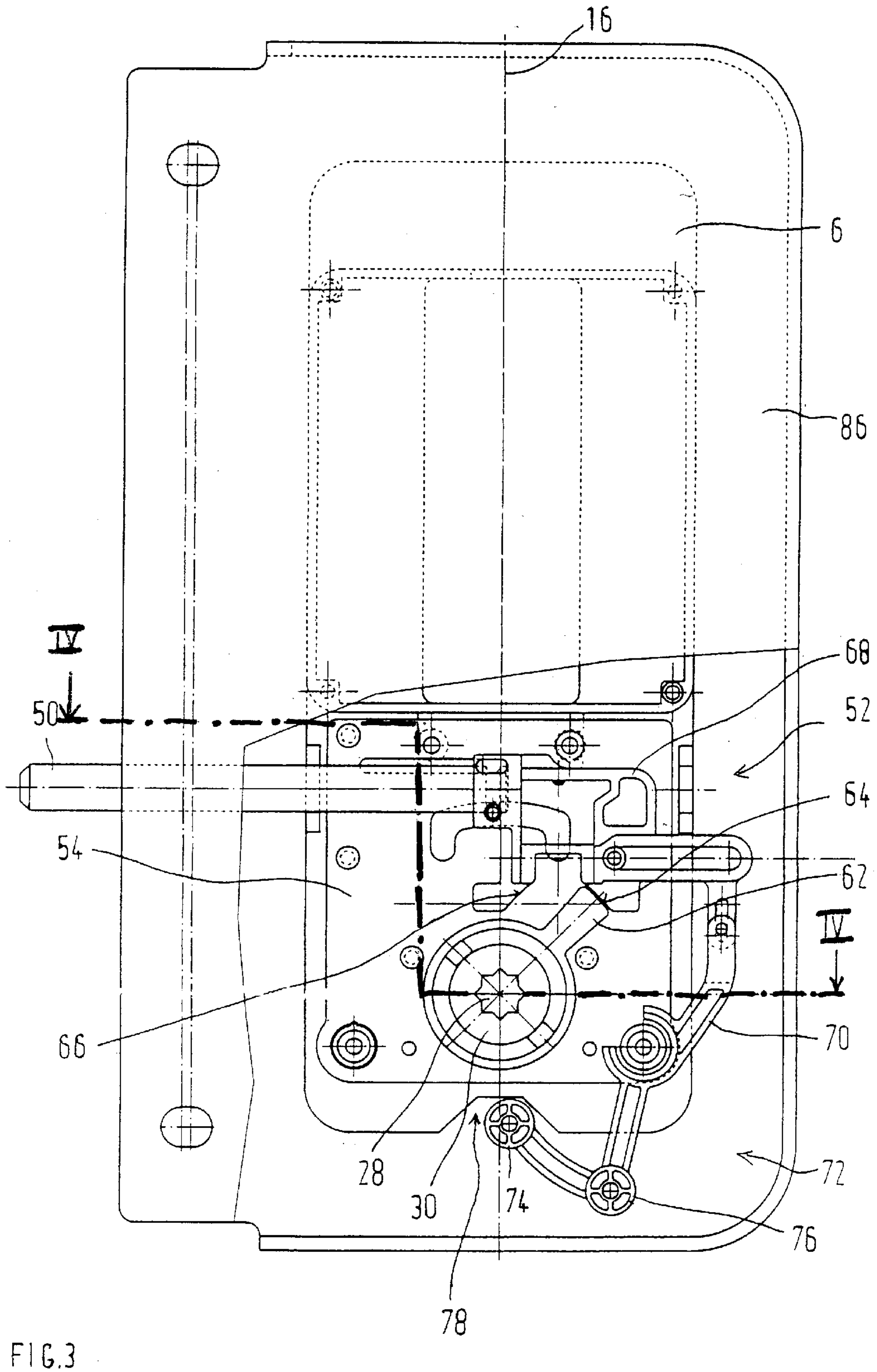
FIG. 3 is a broken-open interior view of the door lock of FIG. 1.

As illustrated in a right-handed hung door of FIG. 3, the nut 30 has a radially projecting lever 62 which can strike by means of its face onto inclined stop surfaces 64, 66 of latch holder 68 of the latching mechanism 52, which latch holder 68 acts upon the latch 50. According to FIG. 3, the lever 62 of the nut 30 is caused to impact, for example, on the right stop surface 64 by the right-hand rotation of the insert 22, whereby the assigned latch holder 68 transports the latch 50 toward the right into a moved-in position, in which it can no longer engage with its free end in the door portal engaging device and the door lock 1 is therefore opened. In contrast, by means of a left-hand rotation of the insert 22, the lever 62 of the nut 30, by resting against the left stop surface 66, moves the latch 50 into a moved-out position, in which it locks the door lock 1. According to the preferred embodiment, the insert 22 is a 90-degree closing device, that is, for an opening or closing operation, the insert 22 must be rotated 90 degrees. However, a 180-degree closing device can also be used, in which case the lever 62 of the nut 30 will then rotate empty after the implemented stop on the stop surfaces 64, 66 until its angular end position is reached.

For a left-handed pivoting door, the latch 50 extends out the other side of the lock carrier area 2 and the latching mechanism 52 is appropriately reversed.

Alternatively, in some constructions, the lock 1 could be mounted with the grip recess opening 10 located in a reverse position from that shown.

A bolt position indicator 72, which can be operated by the latch holder 68 by means of a lever mechanism 70 to permit the recognition of the locked or unlocked condition of the door lock 1 from the exterior side. For example, for the unlocked condition, an indicating surface 74 with a green color field and, for the locked condition, an indicating surface 76 with a red color field is transported into a bottom-side recess 78 of the screen 8 arranged in the area of the center axis 16 of the basic component 6 (see FIGS. 1 and 3). The bottom-side recess 78 of the screen 8 is situated opposite a gap in the blackening 38 of the door glass pane 34, so that the surface with color fields 74, 76 are easily visible from the exterior side. Lever mechanism 70 is operated by the latching mechanism 52 to move surface 76 into the location shown by surface 74 in FIG. 3 when the latch 50 is extended.

The latching mechanism carrier, preferably formed by the two plates 54, is detachably fastened on the carrying pins 58 of the basic component 6 and can also be fitted onto the carrying pins 58 in the reverse position, in which the latch 50 points in the opposite direction. The door lock 1 can then optionally be mounted for a door hung on the right or for a door hung on the left. The indicating surfaces 74, 76 are each provided on both sides with a color field so that, also in the case of a reversed latching mechanism 52, the color fields will be visible in the center recess 78 of the screen 8. Toward the exterior side, the latching mechanism 52 is covered by the screen 8 and, toward the interior side, it is covered by a covering 86 fastened on the door frame 32. When the latching mechanism support, including plates, 54 is removed from the basic component 6, the insert 22, instead of being inserted from the exterior side, can also be inserted from the interior side into the cylindrical section 20 of the basic component 6.

Furthermore, as shown in FIG. 4, an opening device 80, which acts upon the latching mechanism 52, is provided for unlocking the latched door lock 1 from the inside. Opening device 80 is formed, for example, by a handwheel 82 which, by means of its cylindrical end, is rotatably disposed in the nut 30 and is non-rotatably connected with a disk 84 which acts upon the latch holder 68 of the latching mechanism 52. By rotating the handwheel 82, the door lock 1, which is in the locked position, can therefore be unlocked from the interior side, for example, in the event of emergencies.

Although the present invention has been described and illustrated in detail, it is to be clearly understood that this is done by way of illustration and example only and is not to be taken by way of limitation. The spirit and scope of the present invention are to be limited only by the terms of the appended claims.

We claim:

1. A commercial vehicle, rail or bus vehicle entry door comprising:

a grip recess;

a door lock;

a closing device;

a latching mechanism having at least one latch;

a lock carrier area;

a latching mechanism carrier;

wherein the door lock is held on the door and the closing device acts upon the latching mechanism in order to move the at least one latch of the latching mechanism into a closed or opened position; and wherein the lock carrier area can be fastened on the door and which, together with the grip recess, forms a one-piece basic component on which the latching mechanism carrier carries the latching mechanism in a detachable and reversible manner for the optional mounting of the door lock for a door hung by one of a right side mounting and one of a left side mounting.

2. The commercial vehicle, rail or bus vehicle entry door according to claim 1, wherein the basic component is constructed as a standardized carrier element for different door locks.

3. The commercial vehicle, rail or bus vehicle entry door according to claim 1, wherein the latching mechanism carrier contains at least one plate with bores which can be fitted onto at least one carrying pin projecting away from the basic component.

4. The commercial vehicle, rail or bus vehicle entry door according to claim 1, wherein the door lock has a receiving device for different closing devices, which receiving device contains a nut rotatably disposed between two parallel plates forming the latching mechanism carrier, which nut has a passage opening, on whose radially interior circumferential surface a polygonal surface is provided for the engagement of different connection elements of the closing devices.

5. The commercial vehicle, rail or bus vehicle entry door according claim 1, further including a door frame extending around the door circumference, on which door frame a door glass pane is fastened which extends essentially along the entire door height and door width.

6. The commercial vehicle, rail or bus vehicle entry door according to claim 5, wherein the basic component is fixed to the door glass pane in an area of a blackening extending around an area of the immediate vicinity of the door frame, without any direct connection to the door frame.

7. The commercial vehicle, rail or bus vehicle entry door according to claim 6, wherein a latch position indicator exists which is integrated in the latching mechanism and by means of which the currently existing latched or unlatched position of the latch is visible through a gap in the blackening.

8. The commercial vehicle, rail or bus vehicle entry door according to claim 6, wherein the basic component has a centering collar which is inserted into an oblong hole of the door glass pane from the interior side of the door and penetrates the interior side of the door.

9. The commercial vehicle, rail or bus vehicle entry door according to claim 5, wherein the basic component contains a flat screen, which screen has a surrounding pulled-back area for receiving glue on its side facing the door glass pane.

10. The commercial vehicle, rail or bus vehicle entry door according to claim 5, wherein a passage bore aligned with the at least one latch is provided as a passage for the at least one latch in the door frame.

11. The commercial vehicle, rail or bus vehicle entry door according to claim 1, further including an opening device for unlocking a locked door lock from the interior and which acts upon the latching mechanism and is surrounded by a handwheel.

12. The commercial vehicle, rail or bus vehicle according to claim 1, wherein the door is hung on the right.

13. The commercial vehicle, rail or bus vehicle according to claim 1, wherein the door is hung on the left.

14. The commercial vehicle, rail or bus vehicle entry door according to claim 4, wherein the closing device is one of a 90-degree and 180-degree closing device.

15. The commercial vehicle, rail or bus vehicle according to claim 6, wherein the basic component is fixed to the door glass pane by glueing.

16. The commercial vehicle, rail or bus vehicle according to claim 9, wherein the glue can be on a glue strip pad.

17. The commercial vehicle, rail or bus vehicle entry door according to claim 5, wherein the basic component is fixed to the door glass pane.

* * * * *